May 25, 1965  B. R. ZITNER  3,185,470
UNIVERSAL WORK CLAMPING FIXTURES FOR MACHINE TOOLS
Filed July 30, 1963  3 Sheets-Sheet 1

INVENTOR.
Berthold R. Zitner
BY
*Morsell & Morsell*
Attorneys

May 25, 1965        B. R. ZITNER        3,185,470
UNIVERSAL WORK CLAMPING FIXTURES FOR MACHINE TOOLS
Filed July 30, 1963        3 Sheets-Sheet 2
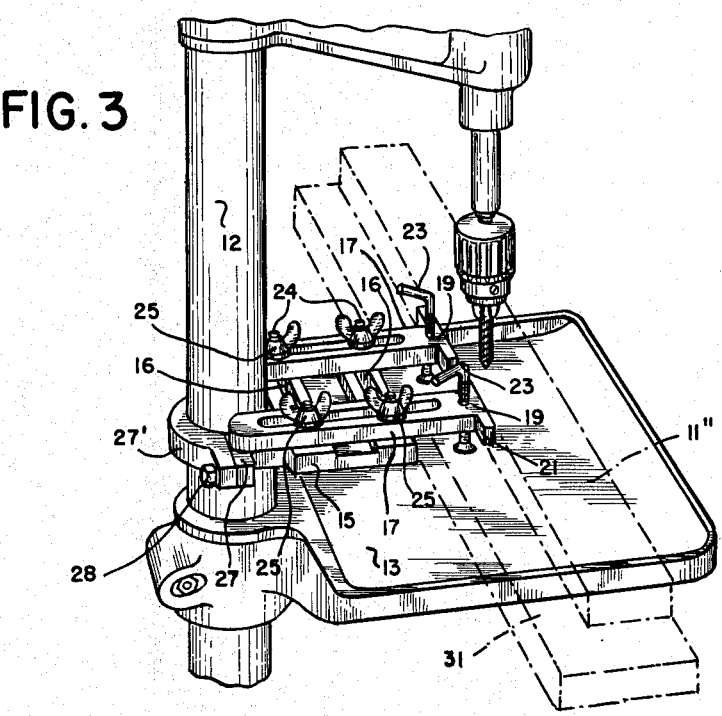
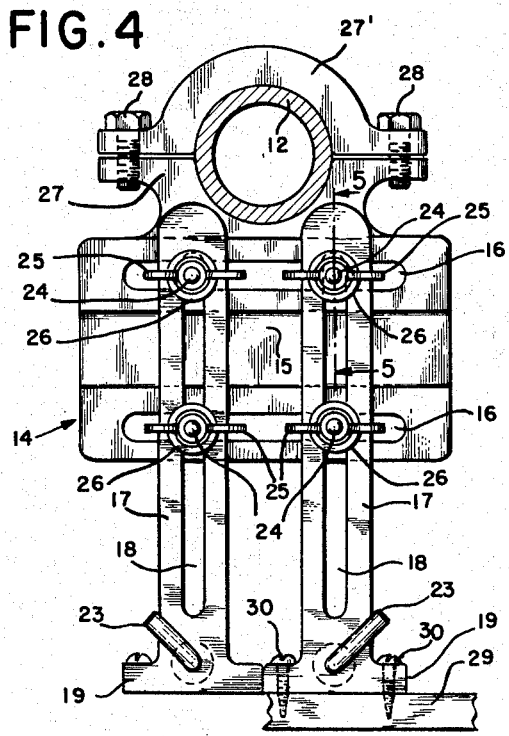
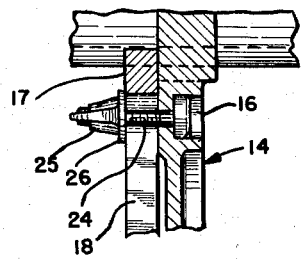
INVENTOR.
Berthold R. Zitner
BY
Morsell & Morsell
Attorneys

United States Patent Office 3,185,470
Patented May 25, 1965

3,185,470
UNIVERSAL WORK CLAMPING FIXTURES FOR MACHINE TOOLS
Berthold R. Zitner, 3336 N. 50th St., Milwaukee 15, Wis.
Filed July 30, 1963, Ser. No. 298,782
1 Claim. (Cl. 269—91)

This invention relates to improvements in universal work clamping fixtures for machine tools, and more particularly to a work clamping fixture adapted to be permanently adjustably carried by the vertical column of a wood or metal working tool for the purpose of clamping work pieces of various sizes and shapes onto the machine tool table in selected positions relative to the tool, or to provide a selectively positioned fence or gauge against which the work may be positioned and accurately moved relative to the tool.

A more specific object of the invention is to provide a work clamping fixture of the character described which is horizontally rotatably and vertically adjustably mounted on the machine tool post for proper engagement with a piece of work either clamped in position or adapted to be advanced along a fence or gauge clamped to the fixture.

A further object of the invention is to provide a universal work clamping fixture for machine tools which facilitates operation on pieces of work and eliminates complicated work clamping or positioning "setups" and which is adaptable to various types of equipment.

A further object of the invention is to provide a universal work clamping fixture for machine tools which may be permanently applied to the vertical column of a tool so as to be available at all times for use in connection with work pieces but which, when not in use, may be swung to an out-of-the-way position remote from the tool, or which may be easily removed from or mounted on the tool column or post.

A further object of the invention is to provide a universal work clamping fixture for machine tools which is of very simple construction, which is strong and durable, which is efficient in operation, which is easily manipulated and susceptible of adjustment to a variety of positions, and which is well adapted for the purposes described.

With the above and other objects in view, the invention consists of the improved universal work clamping fixture for machine tools and its parts and combinations as set forth in the claims, and all equivalents thereof.

In the accompanying drawings in which the same reference characters indicate the same parts in all of the views:

FIG. 3 is a fragmentary perspective view of a machine tool having applied to its post the improved work clamping fixture which is adjusted to serve as a work piece stop for accurate multiple drilling;

FIG. 4 is a plan view of the improved work clamping fixture in a certain position of adjustment and applied to the post of a machine tool, the latter being shown in section;

FIG. 5 is an enlarged fragmentary detail sectional view taken on line 5—5 of FIG. 4.

While the machine illustrated in the accompanying drawings is primarily intended for woodworking, it is understood that the improved work clamping fixture may be used with any similar type of machine tool operating for metal working as well as woodworking.

Figure 1:
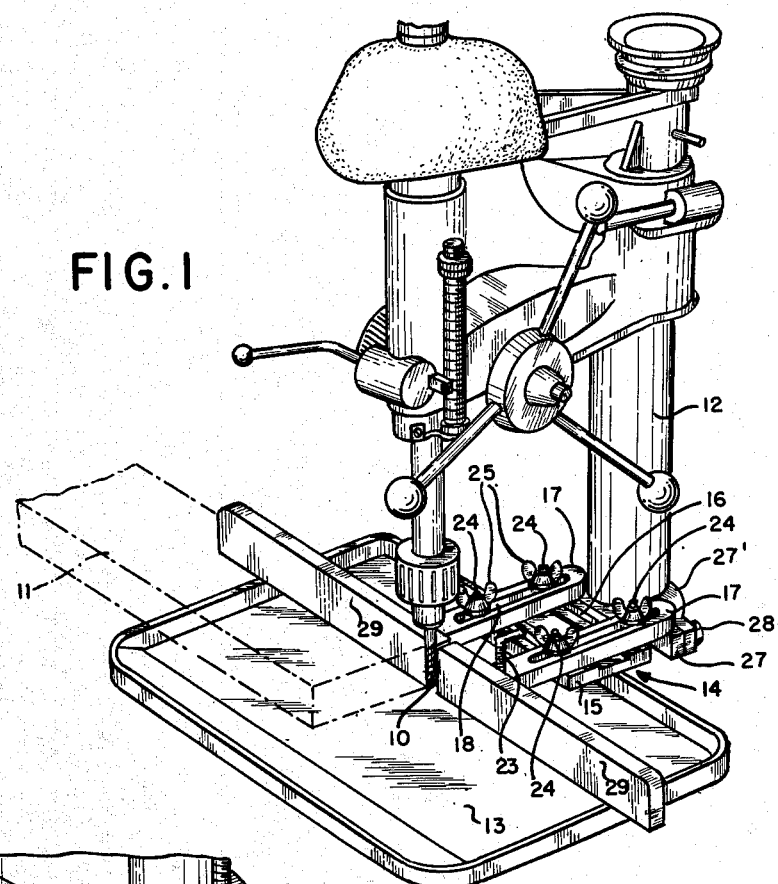
FIG. 1 is a perspective view of a machine tool such as a drill press having the improved work clamping fixture adjustably applied to the vertical column or post of the tool, the fixture being equipped with an interchangeable fence or gauge.

The machine illustrated in FIG. 1 is fitted with a power-operated rotary tool 10 which engages the inner face of a piece of work 11 advanced relative to the tool for shaping or planing the end face of the work. The machine tool, of conventional construction, includes a vertical column or post 12, usually of circular cross-section, and a work table or support 13 extending laterally horizontally from a lower portion of the post 12. Customarily, the work table or support 13 has mounted on its top face in proper position to be operated on by the tool of the machine, a piece of work or stock 11, 11' or 11" in FIGS. 1, 2 and 3 respectively.

The present invention is concerned primarily with the application of a work clamping fixture, generally indicated by the numeral 14, to the post or column 12 of the machine tool in an adjustable manner in order to clamp the work onto the face of the table or support 13, or to hold in proper relationship fences, guide rails or other work supporting means.

Figure 6:
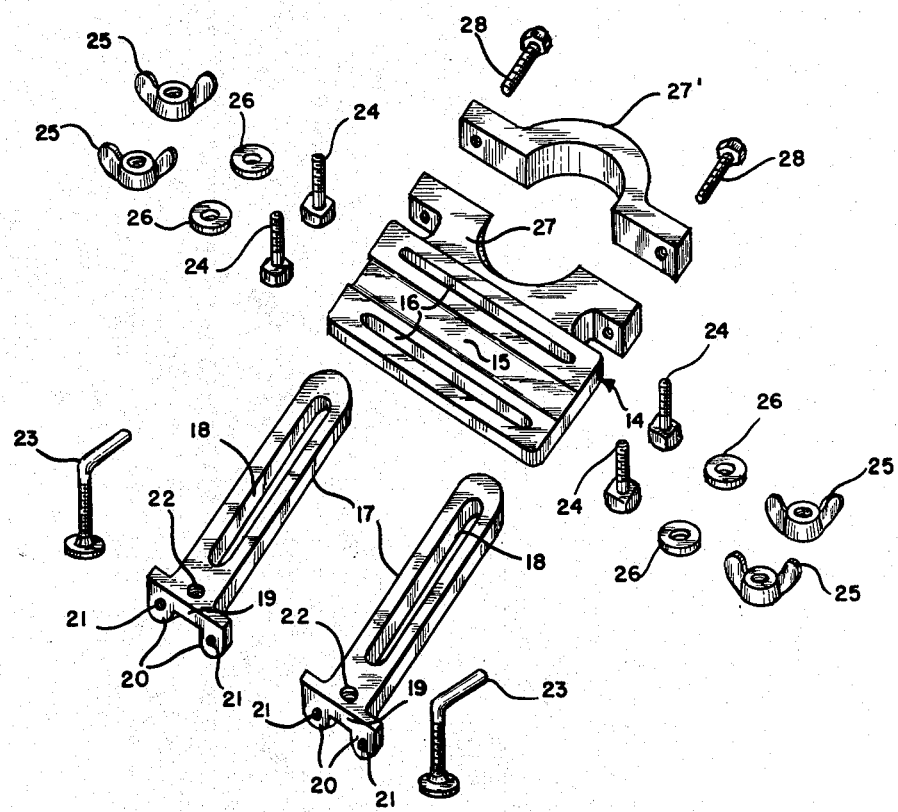
FIG. 6 is an exploded view of the various elements constituting the improved work clamping fixture.

As will be observed best from FIGS. 4 and 6 of the drawing, the work clamping fixture includes a metallic plate 15 provided with a pair of spaced parallel longitudinally extending slots 16 formed in spaced slightly raised portions of the plate. Adapted to be mounted on the top face of the plate 15 in spaced angularly adjusted positions, with their free ends projecting laterally of the front edge of the plate 15, are a pair of bars or straps 17, each being provided with a longitudinal slot 18 therein and each having at its forward end a right angularly projecting flange 19 with spaced-apart work engaging toes or lugs 20 which project substantially below the plane of the undersurface of the bars or straps 17. Each of the toes is formed with a horizontal screw hole 21 therethrough, and each end flange 19, intermediate its ends is formed with a vertical tapped opening 22 to threadably receive the stem portion of an adjustable clamping member 23.

In order to adjustably mount and secure each strap or bar 17 on the top face of the plate 15, pairs of clamping bolts 24 are provided, with each pair of bolts 24 being extended through longitudinally spaced-apart portions of a strap slot 18 and through both of the slots 16 of the plate 14, the slots of the straps usually being transverse to the slots of the plate. The squared heads of the bolts 24 lodge within recessed portions therefor in the undersurface of the plate 15, while the extended upper or outer ends of the bolts adjustably carry winged nuts 25 and interposed washers 26. By comparing the showings in FIGS. 2 and 4 it will be seen that each strap 17 may, through individual adjustment on its bolts 24 and relative positioning of the bolts 24 in the plate slots 16, be mounted in any desired position of adjustment, in which position it is releasably retained by tightening the winged nuts 25.

Offset from a rear edge of the fixture plate 15 and integral therewith is one part of a post clamping element 27 adapted to have associated therewith a complementary clamping element 27'. The clamping elements 27 and 27' are adapted to cooperate in embracing a desired portion of the machine tool post 12 and are clamped thereto in a desired position by bolts 28 which entered tapped openings therefor in the abutting flanges of the members 27 and 27'. The bolts 28, when loosened, permit the fixture to be rotated on the post 12 or to be adjusted vertically thereon.

Figure 2:
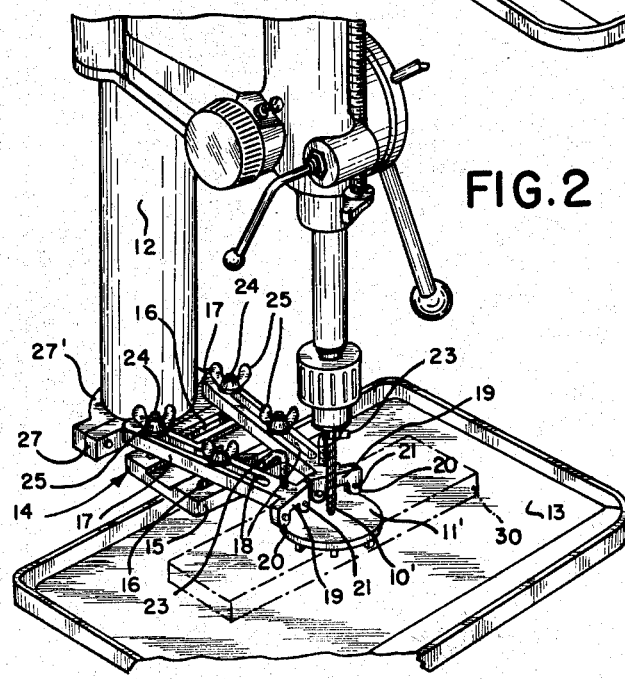
FIG. 2 is a fragmentary perspective view of a machine tool equipped with the improved clamping fixture, the latter being adjusted to function as a hold-down clamp in respect to work being drilled.

FIGS. 1, 2 and 3 illustrate various uses to which the improved work clamping fixture may be put in relation to a piece of work being operated on by a machine tool. These illustrations are merely typical and are not all inclusive in respect to the various adjustments of the straps or bars 17 and the manner in which they are utilized. In FIG. 1, for instance, and as is also shown in a portion of FIG. 4, the straps 17 are extended forwardly of the front edges of the plate 14 and are secured in parallel relationship and at right angles to the plate slots 16. The front faces of each of the bar flanges 19 may have applied thereto wooden work gauges or fences 29 which are held to the bar flanges 19 by screws or bolts 30 (see FIG. 4) which are extended through the flange openings 21 into the stock of the rails or fences 29. With this adjustment a piece of work or stock 11, resting on the machine tool table or support 13 may be positioned against one of the gauges 29 and advanced relative to the rotating tool 10 which will operate on the inner face of the work or stock 11 as it is advanced relative to the tool and along the fences or gauges 29.

In FIG. 2, the machine tool is shown as being equipped with a drill 10' and a piece of work 11', which is to be drilled is, if necessary, supported on a block 30 or other elevating means. The bars 17 are adjusted in an angular relation relative to each other so that the toed undersurfaces of their flanged extremities 19 rest on the work 11' to which they are clamped by turning down the clamping bolts 23. Thus the work is securely held in a desired position and it may be readily drilled by the tool 10'.

FIG. 3 shows an arrangement which may be utilized for accurate multiple drilling and the elongated piece of work or stock 11' may rest on a spacing block 31 against the top of which the outer extended portions of the fixture bars 17 are clamped by the bolts 23. In this condition the flanged ends 19 of the bars 17 do not carry any accessories but of themselves form a gauge against which a face of the work stock 11" is positioned and along which the stock may be advanced in order to accomplish accurate multiple drilling.

The improved universal work clamping fixture is at all times associated with and carried by the post 12 of the machine tool. From the description heretofore given it will be appreciated that the work clamping fixture is susceptible of universal adjustment and the plate 14 and bars 17 may be secured in such positions as to afford the best clamping effect on the work or to provide mounting means for fences or work gauges. If the work clamping fixture is not to be used it can be swung circularly on the post of the machine to an out-of-the-way position, but it is always available for use with the component parts of the clamping fixture all assembled to prevent loss or misplacement thereof.

The improved universal work clamping fixture for machine tools is of simple and novel construction, is easily manipulated, is susceptible of a multiplicity of adjustments in respect to work, associated gauges, spacing blocks, and the supporting table, and is well adapted for the purposes described.

What I claim is:

The combination with a machine tool including a vertical post and a work supporting table projecting laterally from the post, of a work clamping fixture comprising a plate vertically and rotatably adjustably mounted on said machine tool post and overlying the table at right angles to the axis of the post and having a pair of spaced-apart parallel slots therein transverse to the direction of projection of the plate relative to the post, a pair of longitudinally slotted bars spacedly adjustably mounted on the plate in positions wherein the slots of the bars are at angles to the slots of the plate with the outer ends of the bars projecting beyond the front margin of the plate, adjustable securing members for each bar extending through its bar slot and both parallel slots of the plate to rigidly mount the bars on the plate in position of adjustment, the outer ends of the bars being formed with gauging and clamping flanges and work engaging toes provided with means for the removable attachment of auxiliary upright gauges at right angles to the axis of the bars, and additional adjustable clamping means carried by the outer ends of the bars at right angles thereto to engage table supported elements.

References Cited by the Examiner
UNITED STATES PATENTS 727,337   5/03   Forster _ _ _ _ _ _ _ _ _ _ _ _ _ 144—253.9
2,866,367   12/58   Wilkes _ _ _ _ _ _ _ _ _ _ _ _ _ _ _ _ 77—63

ROBERT C. RIORDON, *Primary Examiner.*

FRANK SUSKO, *Examiner.*